US012634329B2

(12) United States Patent
Kelly et al.

(10) Patent No.: US 12,634,329 B2
(45) Date of Patent: *May 19, 2026

(54) DYNAMIC ADJUSTMENT OF NETWORK SCANNER RESPONSE TIMEOUT BASED ON NETWORK LATENCY MEASUREMENTS

(71) Applicant: Rapid7, Inc., Boston, MA (US)

(72) Inventors: Emmett Kelly, Belfast (GB); Paul Miseiko, Mississauga (CA)

(73) Assignee: Rapid7, Inc., Boston, MA (US)

( * ) Notice: Subject to any disclaimer, the term of this patent is extended or adjusted under 35 U.S.C. 154(b) by 132 days.

This patent is subject to a terminal disclaimer.

(21) Appl. No.: 18/775,026

(22) Filed: Jul. 17, 2024

(65) Prior Publication Data

US 2024/0372887 A1 Nov. 7, 2024

Related U.S. Application Data

(63) Continuation of application No. 17/694,802, filed on Mar. 15, 2022, now Pat. No. 12,069,084.

(51) Int. Cl.
*H04L 29/06* (2006.01)
*H04L 9/40* (2022.01)

(52) U.S. Cl.
CPC ................................. *H04L 63/1433* (2013.01)

(58) Field of Classification Search
CPC ............. H04L 63/1433; H04L 63/1408; H04L 63/1475
See application file for complete search history.

(56) References Cited

U.S. PATENT DOCUMENTS

| | | | | | |
|---|---|---|---|---|---|
| 7,124,181 | B1 * | 10/2006 | Magdych | .............. | H04L 63/108 |
| | | | | | 709/224 |
| 2004/0078384 | A1 * | 4/2004 | Keir | ........................ | H04L 41/12 |
| | | | | | 707/999.102 |
| 2007/0097963 | A1 * | 5/2007 | Thermos | ............. | H04M 7/0078 |
| | | | | | 370/352 |
| 2011/0243002 | A1 * | 10/2011 | Tsuruoka | .............. | H04W 24/04 |
| | | | | | 370/252 |
| 2021/0185073 | A1 * | 6/2021 | Ewaida | ............... | H04L 63/1433 |

OTHER PUBLICATIONS

Chen, Xiaoqi, et al. "Measuring TCP round-trip time in the data plane." Proceedings of the Workshop on Secure Programmable Network Infrastructure. 2020. (Year: 2020).*

* cited by examiner

*Primary Examiner* — Ka Shan Choy
(74) *Attorney, Agent, or Firm* — Ashwin Anand

(57) ABSTRACT

Various embodiments include systems and methods to implement network scanner timeouts based at least in part on historical network conditions. The implementing comprises initiating, using one or more network scanners and according to a first set of timeout parameters, a first security assessment of one or more scan targets in a network, wherein the first set of timeout parameters comprises a first initial round trip time (RTT)-timeout parameter value to which a dynamic RTT-timeout value is initially set. The implementing comprises determining a first set of RTT statistics for the first security assessment. The implementing comprises determining, based at least in part on the first set of RTT statistics, a second set of timeout parameters for a second security assessment of the one or more scan targets. The implementing comprises initiating, according to the second set of timeout parameters, the second security assessment of the one or more scan targets.

20 Claims, 5 Drawing Sheets

200

Set dynamic Round Trip Time (RTT) timeout value to an initial RTT-timeout parameter
210

Monitor network latency
220

No

Dynamic RTT timeout value adjustment triggered?
230

Yes

Adjust the dynamic RTT timeout value within a predefined range of RTT-timeout parameter values (e.g., values for a minimum RTT-timeout parameter and a maximum RTT-timeout parameter)
240

300

Retrieve, from a scan results data store associated with a network scanner, statistical data related to results of at least one previous probe of a set of scan targets, where the statistical data for a given scan target includes at least an average round trip time (RTT) value for the given scan target
310

Identify, based on the average RTT values for the set of scan targets, a maximum average RTT value as a maximum smoothed RTT value from the at least one previous probe
320

Calculate, based at least in part on the maximum smoothed RTT value, a value for an initial RTT-timeout parameter for the network scanner
330

Utilize the network scanner to perform a subsequent probe of the set of scan targets, where the network scanner determines a dynamic RTT timeout value based at least in part on the calculated value for the initial RTT-timeout parameter
340

Initiate, using one or more network scanners and according to a first set of timeout parameters, a first security assessment of one or more scan targets in a network. The first set of timeout parameters comprises a first initial round trip time (RTT)-timeout parameter value to which a dynamic RTT-timeout value is initially set.
410

Determine a first set of RTT statistics for the first security assessment. The first set of RTT statistics comprises one or more RTT statistics for an individual scan target of the one or more scan targets, and the one or more RTT statistics are determined based at least in part on one or more network probes transmitted to the individual scan target.
420

Determine, based at least in part on the first set of RTT statistics, a second set of timeout parameters for a second security assessment of the one or more scan targets. The second set of timeout parameters comprises a second initial RTT-timeout parameter value to which the dynamic RTT-timeout value is initially set, and the second set of timeout parameters include at least one timeout parameter having a different value compared to a corresponding timeout parameter of the first set of timeout parameters.
430

Initiate, according to the second set of timeout parameters, the second security assessment of the one or more scan targets.
440

*FIG. 4*

DYNAMIC ADJUSTMENT OF NETWORK SCANNER RESPONSE TIMEOUT BASED ON NETWORK LATENCY MEASUREMENTS

This Application claims priority under 35 U.S.C. § 120 and is a continuation of U.S. patent application Ser. No. 17/694,802, filed Mar. 15, 2022, titled "Network Scanner Timeouts," the entire contents of which are incorporated herein by reference in its entirety.

BACKGROUND

Many companies operate private computer networks that are connected to public networks such as the Internet. While such connections allow its users to easily access resources on the public networks, they also expose the company network to potential cyberattacks. For example, company users may unwittingly download malicious content (e.g., data, files, applications, programs, etc.) onto the company network from the Internet. As another example, interactions between company users and outsiders on the public network may result in leaks of proprietary information to allow malicious actors to gain unauthorized access to the company network. Different types of cyberattacks can be used to achieve a variety of different ends, for example, to obtain sensitive information, gain control of the company's computing systems, or damage the company's resources. As a result, enterprise security management systems have become increasingly important to protect private company networks against these types of vulnerabilities.

A network scanning tool can determine whether a scan target port is responsive by sending various probes to the port and waiting for a response. A timeout parameter may be supplied to the network scanning tool to control the amount of time to wait for a response from a remote port before determining that the remote port is not responsive to a probe. Altering such a timeout parameter can alter the time spent waiting for the network scanning tool to scan target ports which are either unavailable or do not respond to the probe. As such, a change to the timeout parameter may potentially result in a significant reduction in an execution time of the network scanning tool. Accordingly, there is a need for systems and methods for identifying appropriate timeout parameters to achieve satisfactory execution times for network scanning tools.

SUMMARY OF EMBODIMENTS

The systems and methods described herein may be employed in various combinations and in embodiments to implement network scanner timeouts based at least in part on historical network conditions.

BRIEF DESCRIPTION OF THE DRAWINGS

FIG. 3 is a flowchart that illustrates an example process of implementing network scanner timeouts based at least in part on historical network conditions, according to some embodiments.

FIG. 4 is a flowchart that illustrates an example process of implementing network scanner timeouts based at least in part on historical network conditions, according to some embodiments.

Figure 1:
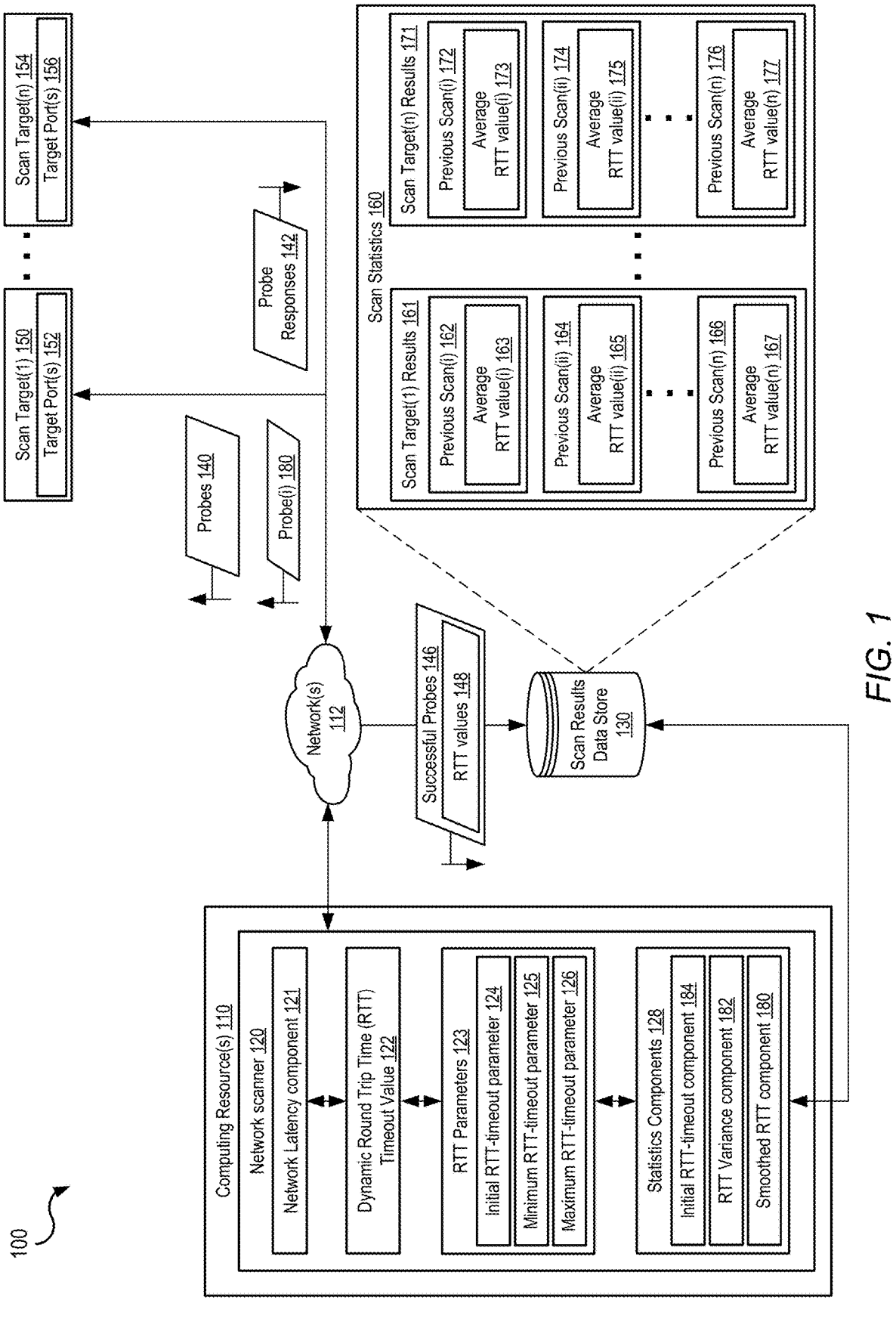
FIG. 1 is a block diagram illustrating an example system that implements network scanner timeouts based at least in part on historical network conditions, in accordance with some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The present disclosure describes systems and methods of implementing network scanner timeouts based at least in part on historical network conditions. The output from network scanning tools upon completion of a scan may include statistics on the average round trip time (RTT) of probes sent to each scan target. The present disclosure utilizes these RTT statistics from previous scans to determine a satisfactory value for the timeout parameters based on a maximum RTT for successful probes during previous network scans.

As described herein, the system of the present disclosure may be configured to automatically determine, based on historical scan data, a satisfactory RTT timeout parameter for network scanning tools in order to reduce the time taken to scan a network. In contrast to previous systems that require a manually configured parameter, the present disclosure describes a system to automatically determine the satisfactory value for the network scanner RTT timeout based on historical data.

Network scanning tools may utilize numerous parameters to optimize the time taken to scan networks. To illustrate, a particular network scanning tool may utilize a number of parameters to control how long it will wait for a response to a probe before giving up or retransmitting the probe. These parameters include: an initial RTT-timeout parameter; a minimum RTT-timeout parameter; and a maximum RTT-timeout parameter. This particular network scanning tool may be configured to dynamically determine the amount of time that it will wait for a response based on current scanning conditions, starting with the initial RTT-timeout parameter and gradually altering the timeout parameter between the minimum RTT-timeout parameter and the maximum RTT-timeout parameter depending on one or more measurements related to network latency.

Accordingly, in this example, the value selected for the initial RTT-timeout parameter corresponds to an initial value for the RTT-timeout parameter. By setting the value for the initial RTT-timeout parameter too high for the network being scanned will cause a network scanning tool to slowly adjust its internal RTT timeout value to a value that is appropriate for the network and higher than the minimum RTT-timeout parameter. By setting the value for the initial RTT-timeout parameter too low for the network being scanned will cause the network scanning tool to fail to receive responses to probes and therefore trigger probe re-transmissions. This may cause the network scanning tool to dynamically increase its internal RTT timeout value until re-transmissions stop or a value for the maximum RTT-timeout parameter is reached.

As described herein, the systems and methods of the present disclosure may be utilized to set the initial RTT-timeout parameter to a value that is appropriate to the network being scanned. This may enable the network scanning tool to utilize an internal RTT timeout value that is closer to the optimal value, thereby reducing or eliminating the dynamic adjustment of the internal RTT timeout value. This may reduce the amount of time for the network scanning tool to complete its scan.

Scan results for scans performed by the network scanning tool may include statistics about the RTT values of successful probes for each host scanned. For example, the statistics included in the scan results for each host may include: a smoothed RTT value; an RTT variance value; and a timeout value. The smoothed RTT value may correspond to the network scanning tool's calculated estimate of the RTT to the host based on an average RTT of successful probes to that host. The RTT variance value may correspond to the network scanning tool's measurement of variance in the RTT. The timeout value may correspond to a particular value that the network scanning tool utilizes when waiting on a probe response. With respect to the RTT variance, a higher variance value may result in the network scanning tool utilizing a timeout value that is significantly higher than the smoothed RTT value. By contrast, with respect to the RTT variance, a lower variance may result in the network scanning tool utilizing a timeout value that is closer to the smoothed RTT value.

The systems and methods of the present disclosure may be utilized to determine an optimal initial RTT-timeout parameter to set for a next execution of the scanning tool using the smoothed RTT values from a previous execution. A maximum smoothed RTT value may be identified in a set of results from the previous execution, and an initial RTT-timeout value for the scanning tool may be set based at least in part on this maximum smoothed RTT value.

According to some embodiments, the following equation may be utilized to determine the initial RTT-timeout value (identified as "rttinitial") using the maximum smoothed RTT value (identified as "(max(rttsmoothed)"):

$$rttinitial = (\max(rttsmoothed) + c) * k$$

In the above equation, c is a constant and k is a coefficient. One of ordinary skill in the art will appreciate that the most appropriate values for the constant and the coefficient in the above equation may be determined by iteratively evaluating various combinations.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, and components have not been described in detail so as not to unnecessarily obscure aspects of the embodiments.

Referring to FIG. 1, a block diagram illustrates various components of an example system 100 that implements network scanner timeouts based at least in part on historical network conditions, in accordance with some embodiments. FIG. 1 depicts one or more computing resources 110, which may include one or more hardware processors with associated memory (not shown, see e.g., FIG. 5). The computing resource(s) 110 may be configured to implement network scanner timeouts based at least in part on historical network conditions.

According to various embodiments, FIG. 1 illustrates that the computing resource(s) 110 may include at least one network scanner 120, which may be configured to determine whether a port (of a given scan target) is responsive by sending various probes to the port and waiting for a response. As described herein, the network scanner 120 may utilize a dynamic timeout parameter to control the amount of time to wait for a response from a given port before determining that the given port is not responsive to a given probe. Utilizing a dynamic timeout parameter may reduce the time spent waiting for the network scanner 120 to scan target ports which are either unavailable or do not respond to the probe, which may advantageously result in a reduction in an execution time of the network scanner 120, as described further herein.

FIG. 1 illustrates that, according to some embodiments, the network scanner 120 may include: a network latency component 121; a dynamic RTT timeout value 122; various RTT parameters 123; and various statistics components 128. The network latency component 121 may be configured to measure network latency as an indication of current scanning conditions. The dynamic RTT timeout value 122 may correspond to how long the network scanner 120 will wait for a response to a probe before giving up or re-transmitting the probe. In the embodiment depicted in FIG. 1, the various RTT parameters 123 include: an initial RTT-timeout parameter 124; a minimum RTT-timeout parameter 125; and a maximum RTT-timeout parameter 126. As described further herein, the network scanner 120 may be configured to determine the dynamic RTT timeout value 122 based on current scanning conditions, starting with the initial RTT-timeout parameter 124 and gradually altering it between the minimum RTT-timeout parameter 125 and the maximum RTT-timeout parameter 126 depending on the network latency measured by the network latency component 121.

According to some embodiments, FIG. 1 illustrates that multiple scan targets may be associated with at least one network 112. For example, the multiple scan targets may include a first scan target 150 (having one or more target ports 152), up to an nth scan target 154 (having one or more target ports 156). According to some embodiments, the first scan target 150 may correspond to a first internet protocol (IP) address, and each of the one or more target ports 152 may be associated with the first IP address. According to some embodiments, other scan targets (up to and including the nth scan target 154) may correspond to a particular IP address, and each of one or more target ports may be associated with the particular IP address. For example, the nth scan target 154 may correspond to an nth IP address, and each of the one or more target ports 156 may be associated with the nth IP address.

Upon completion of a scan of a given scan target, the network scanner 120 may be configured to generate statistics on the average round trip time (RTT) of probes 140 sent to each scan target based on the associated probe responses 142

(in cases where a given target port is responsive to a given probe, also referred to herein as a "successful" probe). For example, FIG. 1 illustrates that the network scanner 120 may be configured to store information associated with successful probes 146 (including RTT values 148) at a scan results data store 130.

According to some embodiments, FIG. 1 illustrates that the scan results data store 130 may be configured to store various scan statistics 160. For example, with respect to the first scan target 150, the scan results data store 130 may store a first set of scan results 161 (identified as "Scan Target(1) Results" in FIG. 1). In FIG. 1, the first set of scan results 161 includes at least the average RTT values for one or more previous scans of the first scan target 150. According to some embodiments, FIG. 1 illustrates that the first set of scan results 161 may include scan statistics associated with multiple previous scans. To illustrate, for a previous scan 162 (identified as "Previous Scan(i)" in FIG. 1) corresponding to a most recent successful probe of the first scan target 150, the first set of scan results 161 may include at least an average RTT value 163 (identified as "Average RTT value (i)" in FIG. 1). According to some embodiments, the first set of scan results 161 may further one or more additional average RTT values associated with additional previous scans corresponding to preceding successful probes of the first scan target 150. To illustrate, for another previous scan 164 (identified as "Previous Scan(ii)" in FIG. 1) corresponding to a preceding successful probe of the first scan target 150, the first set of scan results 161 may include at least an average RTT value 165 (identified as "Average RTT value (ii)" in FIG. 1). According to some embodiments, the first set of scan results 161 may further include, for another previous scan 166 (identified as "Previous Scan(n)" in FIG. 1) corresponding to another preceding successful probe of the first scan target 150, at least an average RTT value 167 (identified as "Average RTT value(n)" in FIG. 1).

With respect to the nth scan target 154, FIG. 1 illustrates that the scan results data store 130 may store an nth set of scan results 171 (identified as "Scan Target(n) Results" in FIG. 1). In FIG. 1, the nth set of scan results 171 includes at least the average RTT values for one or more previous scans of the nth scan target 154. According to some embodiments, FIG. 1 illustrates that the nth set of scan results 171 may include scan statistics associated with multiple previous scans. To illustrate, for a previous scan 172 (identified as "Previous Scan(i)" in FIG. 1) corresponding to a most recent successful probe of the nth scan target 154, the nth set of scan results 171 may include at least an average RTT value 173 (identified as "Average RTT value(i)" in FIG. 1). According to some embodiments, the nth set of scan results 171 may further one or more additional average RTT values associated with additional previous scans corresponding to preceding successful probes of the nth scan target 154. To illustrate, for another previous scan 174 (identified as "Previous Scan(ii)" in FIG. 1) corresponding to a preceding successful probe of the nth scan target 154, the nth set of scan results 171 may include at least an average RTT value 175 (identified as "Average RTT value(ii)" in FIG. 1). According to some embodiments, the nth set of scan results 171 may further include, for another previous scan 176 (identified as "Previous Scan(n)" in FIG. 1) corresponding to another preceding successful probe of the nth scan target 154, at least an average RTT value 177 (identified as "Average RTT value(n)" in FIG. 1).

As further described herein, the network scanner 120 may be configured to utilize the scan statistics 160 from previous scans to determine an optimum value for the timeout parameters based on a maximum RTT for successful probes during previous network scans. Automatically determining, based on historical scan data, an optimum RTT timeout parameter for the network scanner 120 may advantageously reduce the time taken to scan the network 112, in contrast to previous systems that require a manually configured parameter.

According to some embodiments, the statistics components 128 of the network scanner 120 may include: a smoothed RTT component 180; an RTT variance component 182; and an initial RTT-timeout component 184. According to various embodiments, the smoothed RTT component 180 may be configured to identify a maximum smoothed RTT value based on information stored at the scan results data store 130, including at least a set of results from a most recent previous execution of the network scanner 120. To illustrate, the smoothed RTT component 180 may be configured to retrieve, from the scan results data store 130, each of the average RTT values associated with at least a most recent previous scan including the probes 140 of the various scan targets on the network 112 (e.g., the first scan target 150 through the nth scan target 154). As an illustrative, non-limiting example, the smoothed RTT component 180 may determine that the average RTT value 163 included in the first set of scan results 161 may represent a maximum average RTT value of the various average RTT values (e.g., the average RTT values 163 through the average RTT values 173).

According to some embodiments, the smoothed RTT component 180 may be configured to identify the maximum smoothed RTT value based on additional information stored at the scan results data store 130, including at least one additional set of results from at least one additional previous execution of the network scanner 120. To illustrate, the smoothed RTT component 180 may be configured to retrieve, from the scan results data store 130, each of the average RTT values associated with each of the previous scans including the probes 140 of the various scan targets on the network 112 (e.g., the first scan target 150 through the nth scan target 154). As an illustrative, non-limiting example, the smoothed RTT component 180 may determine that one of the average RTT values included in one of the preceding scans represents a maximum average RTT value of the various average RTT values.

The maximum average RTT value determined by the smoothed RTT component 180 (also referred to herein as the "maximum smoothed RTT value") may be utilized to determine a value for the initial RTT-timeout parameter 124 of the RTT parameters 123. According to some embodiments, the initial RTT-timeout component 184 may be configured to utilize the following equation to determine the value for the initial RTT-timeout parameter 124 (identified as "rttinitial" in the equation) using the maximum smoothed RTT value (identified as "(max(rttsmoothed)" in the equation):

$$rttinitial = (\max(rttsmoothed) + c) * k$$

In the above equation, c is a constant and k is a coefficient. One of ordinary skill in the art will appreciate that the most appropriate values for the constant and the coefficient in the above equation may be determined by iteratively evaluating various combinations.

In operation, the network scanner 120 may set an initial value for the dynamic RTT timeout value 122 to the calculated value for the initial RTT-timeout parameter 124 in a subsequent probe 180 (identified as "Probe(i)" in FIG. 1) of the network 112. The network latency component 121 may be configured to collect one or more measurements related to network latency. The network scanner 120 may be configured to adjust the dynamic RTT timeout value 122 (corresponding to an amount of time to wait for a response) based on the current scanning conditions received from the network latency component 121. To illustrate, the network scanner 120 may initiate the subsequent probe 180 by setting the initial RTT-timeout parameter 124 as the dynamic RTT timeout value 122 and gradually altering the dynamic RTT timeout value 122 between the minimum RTT-timeout parameter 125 and the maximum RTT-timeout parameter 126 depending on one or more measurements related to network latency (as received from the network latency component 121).

Thus, FIG. 1 illustrates an example system that implements network scanner timeouts based at least in part on historical network conditions.

Figure 2:
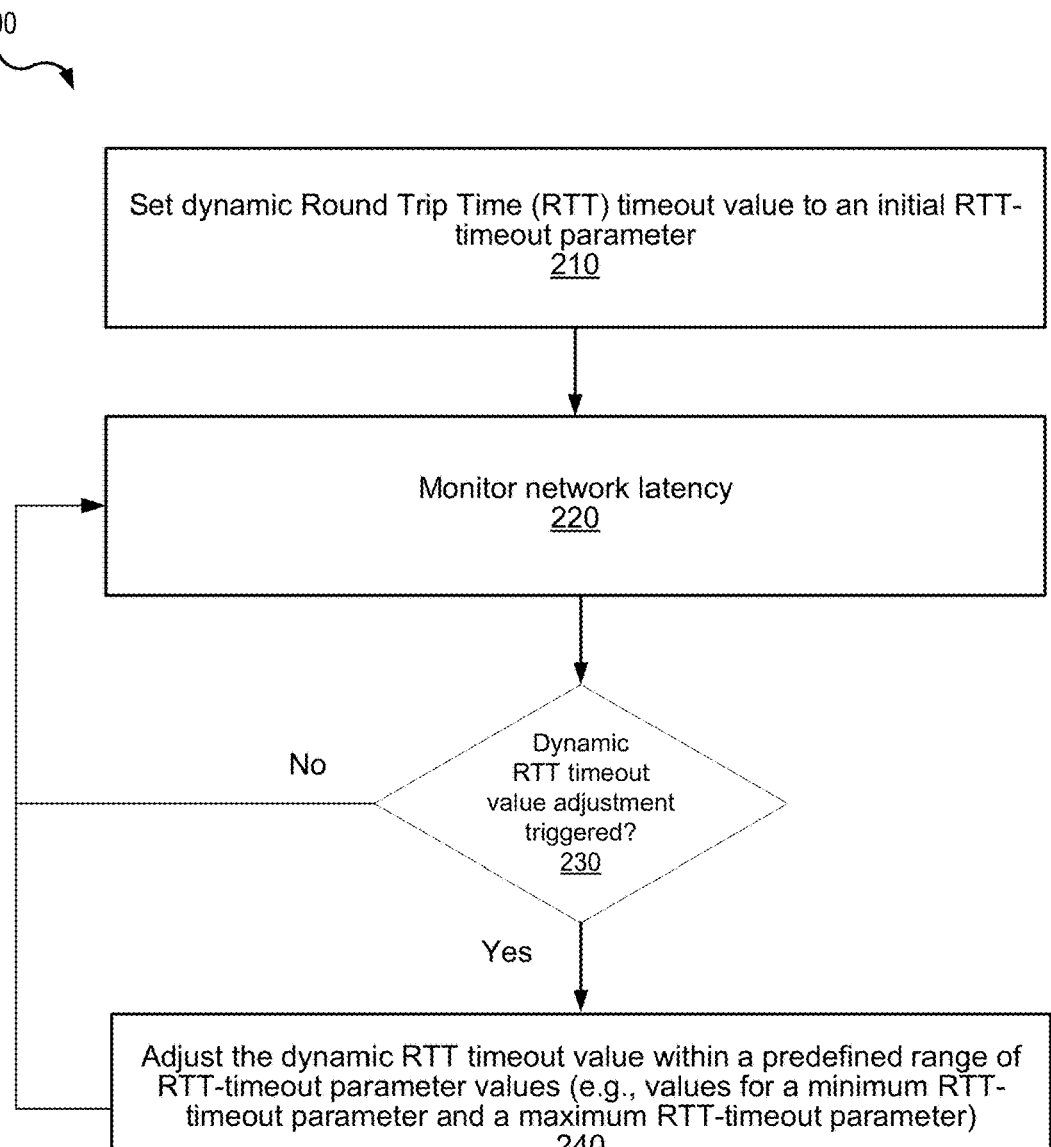
FIG. 2 is a flowchart that illustrates an example process of adjusting a dynamic Round Trip Time (RTT) timeout value based at least in part on network latency conditions, according to some embodiments.

FIG. 2 is a flowchart 200 that illustrates an example of a process of adjusting a dynamic RTT timeout value based at least in part on network latency conditions, according to some embodiments. In FIG. 2, one or more hardware processors may be utilized to implement the example process.

At operation 210, the process includes setting a dynamic RTT timeout value to an initial RTT-timeout parameter. For example, referring to FIG. 1, the network scanner 120 may set the dynamic RTT timeout value 122 to a value for the initial RTT-timeout parameter 124. As previously described herein, the maximum average RTT value determined by the smoothed RTT component 180 (also referred to herein as the "maximum smoothed RTT value") may be utilized to determine a value for the initial RTT-timeout parameter 124.

At operation 220, the process includes monitoring network latency. For example, referring to FIG. 1, the network latency component 121 may be configured to collect one or more measurements related to network latency on the network 112.

At operation 230, the process includes determining whether a dynamic RTT timeout value adjustment has been triggered based at least in part on the network latency measurements. For example, referring to FIG. 1, the network scanner 120 may be configured to determine whether to adjust the dynamic RTT timeout value 122 (corresponding to an amount of time to wait for a response) based on the current scanning conditions received from the network latency component 121.

Responsive to a determination that a dynamic RTT timeout value adjustment has been triggered, the process may proceed to operation 240. Responsive to a determination that a dynamic RTT timeout value adjustment has not been triggered, the process may proceed to operation 220 for continued monitoring of the network latency.

At operation 240, the process includes adjusting the dynamic RTT timeout value within a predefined range of RTT-timeout parameter values. For example, referring to FIG. 1, the network scanner 120 may adjust the dynamic RTT timeout value 122 to a different value within a predefined range of values for the minimum RTT-timeout parameter 125 and for the maximum RTT-timeout parameter 126.

Thus, FIG. 2 illustrates an example of a process of adjusting a dynamic RTT timeout value based at least in part on network latency conditions.

FIG. 3 is a flowchart 300 that illustrates an example of a process of implementing network scanner timeouts based at least in part on historical network conditions, according to some embodiments. In FIG. 3, one or more hardware processors may be utilized to implement the example process.

At operation 310, the process includes retrieving, from a scan results data store associated with a network scanner, statistical data related to results of at least one previous probe of a set of scan targets. The statistical data for a given scan target includes at least an average round trip time (RTT) value for the given scan target. For example, referring to FIG. 1, the smoothed RTT component 180 may retrieve, from the scan results data store 130, at least a subset of the scan statistics 160 related to results of at least one previous probe of the set of scan targets on the network 112 (e.g., the first scan target 150 through the nth scan target 154). To illustrate, the statistical data for a most recent previous scan of the first scan target 150 includes at least the average RTT value 163, and the statistical data for the most recent previous scan of the nth scan target includes at least the average RTT value 173.

At operation 320, the process includes identifying, based on the average RTT values for the set of scan targets, a maximum average RTT value as a maximum smoothed RTT value from the at least one previous probe. For example, referring to FIG. 1, the smoothed RTT component 180 may identify, based on the average RTT values stored at the scan results data store 130, one of the average RTT values that corresponds to a maximum average RTT value as a maximum smoothed RTT value.

At operation 330, the process includes calculating, based at least in part on the maximum smoothed RTT value, a value for an initial RTT-timeout parameter for the network scanner. For example, referring to FIG. 1, the initial RTT-timeout component 184 may calculate, based at least in part on the maximum smoothed RTT value from the smoothed RTT component 180, a value for the initial RTT-timeout parameter 124 for the network scanner 120.

At operation 340, the process includes utilizing the network scanner to perform a subsequent probe of the set of scan targets. The network scanner determines a dynamic RTT timeout value based at least in part on the value for the initial RTT-timeout parameter. For example, referring to FIG. 1, the network scanner 120 may set an initial value of the dynamic RTT timeout value as the initial RTT-timeout parameter 124 to perform the subsequent probe 180. The network scanner 120 may adjust the dynamic RTT timeout value based on scan conditions on the network 112 as measured by the network latency component 121.

Thus, FIG. 3 illustrates an example of a process of implementing network scanner timeouts based at least in part on historical network conditions.

FIG. 4 is a flowchart 400 that illustrates an example of a process of implementing network scanner timeouts based at least in part on historical network conditions, according to some embodiments. In FIG. 4, one or more hardware processors may be utilized to implement the example process.

At operation 410, the process includes initiating, using one or more network scanners and according to a first set of timeout parameters, a first security assessment of one or more scan targets in a network. The first set of timeout parameters comprises a first initial RTT-timeout parameter value to which a dynamic RTT-timeout value is initially set. For example, referring to FIG. 1, the network scanner 120 may initiate, according to a first set of timeout parameters, a first security assessment of one or more of the first scan target 150 through the nth scan target 154 in the network 112. The first set of timeout parameters may include a value for the initial RTT-timeout parameter 124 to which the dynamic RTT timeout value 122 is initially set.

At operation 420, the process includes determining a first set of RTT statistics for the security assessment. The first set of RTT statistics comprises one or more RTT statistics for an individual scan target of the one or more scan targets, and the one or more RTT statistics are determined based at least in part on one or more network probes transmitted to the individual scan target. For example, referring to FIG. 1, the scan statistics 160 stored at the scan results data store 130 may include the first set of scan results 161 associated with the first scan target 150 through the nth set of scan results 171 associated with the nth scan target 154.

At operation 430, the process includes determining, based at least in part on the first set of RTT statistics, a second set of timeout parameters for a second security assessment of the one or more scan targets. The second set of timeout parameters comprises a second initial RTT-timeout parameter value to which the dynamic RTT-timeout value is initially set, and the second set of timeout parameters include at least one timeout parameter having a different value compared to a corresponding timeout parameter of the first set of timeout parameters. For example, referring to FIG. 1, the statistics components 128 of the network scanner 120 may determine, based at least in part on the scan statistics stored at the scan results data store 130, a second set of timeout parameters for a second security assessment.

At operation 440, the process includes initiating, according to the second set of timeout parameters, the second security assessment of the one or more scan targets. For example, referring to FIG. 1, the network scanner 120 may initiate, according to the second set of timeout parameters, the second security assessment of one or more of the first scan target 150 through the nth scan target 154 in the network 112.

Thus, FIG. 4 illustrates an example of a process of implementing network scanner timeouts based at least in part on historical network conditions.

Figure 5:
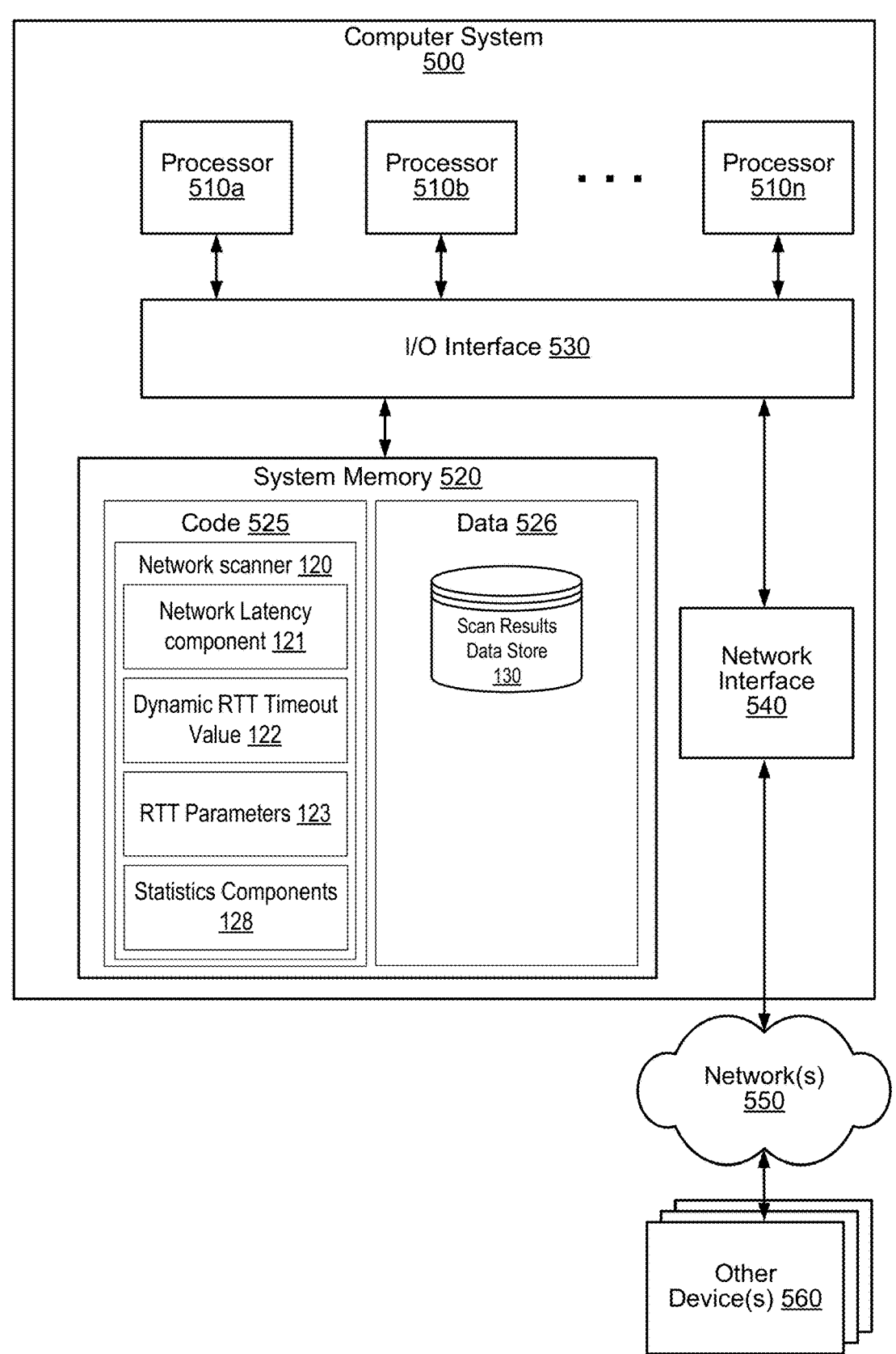
FIG. 5 is a block diagram illustrating an example computer system that may be used to implement one or more portions of a system that implements network scanner timeouts based at least in part on historical network conditions, according to some embodiments.

FIG. 5 is a block diagram illustrating an example computer system 500 that is used to implement one or more portions of a system that implements network scanner timeouts based at least in part on historical network conditions, according to some embodiments. For example, the computer system 500 may be a server that implements one or more components of the computing resource(s) 110 of FIG. 1.

Computer system 500 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 500 includes one or more processors 510, which may include multiple cores coupled to a system memory 520 via an input/output (I/O) interface 530. Computer system 500 further includes a network interface 540 coupled to I/O interface 530. In some embodiments, computer system 500 may be a uniprocessor system including one processor 510, or a multiprocessor system including several processors 510*a-n*, as shown. The processors 510 may be any suitable processors capable of executing instructions. For example, in various embodiments, processors 510 may implement one of a number of instruction set architectures (ISAs), such as the x86, PowerPC, SPARC, or MIPS ISA.

As shown, the computer system 500 may also include one or more network communication devices (e.g., network interface 540) for communicating with other systems and/or components over a communications network. For example, an instance of an application executing on computer system 500 may use network interface 540 to communicate with another server application executing on another computer system, as described herein.

As shown, computer system 500 may use its network interface 540 to communicate with one or more other devices 560, such as persistent storage devices and/or one or more I/O devices. In some embodiments, some of these other devices may be implemented locally on the computer system 500, accessible via the I/O interface 530. In various embodiments, persistent storage devices may include disk drives, tape drives, solid state memory, other mass storage devices, or any other persistent storage device. The computer system 500 may store instructions and/or data in persistent storage devices, and retrieve the stored instruction and/or data as needed.

As shown, the computer system 500 may include one or more system memories 520 that store instructions and data accessible by processor(s) 510. In various embodiments, system memories 520 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 520 may be used to store code 525 or executable instructions to implement the methods and techniques described herein. For example, the executable instructions may include instructions to implement the network scanner 120 (including its associated sub-components: the network latency component 121; the dynamic RTT timeout value 122; the RTT parameters 123; and the statistics components 128), as discussed. The system memory 520 may also be used to store data 526 needed or produced by the executable instructions. For example, the in-memory data 526 may include portions of the scan results data store 130, as discussed.

In some embodiments, some of the code 525 or executable instructions may be persistently stored on the computer system 500 and may have been loaded from external storage media. The persistent storage of the computer system 500 and the external media are examples of non-transitory computer-readable storage media, which may be used to store program instructions to be executed by the computer system 500. A non-transitory computer-readable storage medium may provide the capability to store information in a form readable by a machine (e.g., computer system 500). Non-transitory computer-readable media may include storage media such as magnetic or optical media, disk or DVD/CD-ROM devices, archival tapes, network-attached storage systems, or other computer systems.

In some embodiments, the I/O interface 530 may be configured to coordinate I/O traffic between processor 510, system memory 520 and any peripheral devices in the system, including through network interface 540 or other peripheral interfaces. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB)

standard, for example. In some embodiments, the function of I/O interface 530 may be split into two or more separate components, such as a north bridge and a south bridge, for example. Also, in some embodiments, some or all of the functionality of I/O interface 530, such as an interface to system memory 520, may be incorporated directly into processor 510.

In some embodiments, the network interface 540 may allow data to be exchanged between computer system 500 and other devices attached to a network. The network interface 540 may also allow communication between computer system 500 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems. Multiple input/output devices may be present in computer system 500 or may be distributed on various nodes of a distributed system that includes computer system 500. In some embodiments, similar input/output devices may be separate from computer system 500 and may interact with one or more nodes of a distributed system that includes computer system 500 through a wired or wireless connection, such as over network interface 540. Network interface 540 may commonly support one or more wireless networking protocols (e.g., Wi-Fi/IEEE 802.11, or another wireless networking standard). In some embodiments, the network interface 540 may support communication via telecommunications/telephony networks such as analog voice networks or digital fiber communications networks, via storage area networks such as Fibre Channel SANs, or via any other suitable type of network and/or protocol.

Various modifications and changes may be made as would be obvious to a person skilled in the art having the benefit of this disclosure. The various embodiments described herein are meant to be illustrative and not limiting. Many variations, modifications, additions, and improvements are possible. These and other variations, modifications, additions, and improvements may fall within the scope of embodiments as defined in the claims that follow.

What is claimed is:

1. A system, comprising:
   one or more hardware processors with associated memory that implement a network scanner, configured to:
   perform, according to a set of configuration parameters, a first scan of target ports in a network, wherein the configuration parameters includes a round trip time (RTT)-timeout parameter to which a first RTT-timeout value is initially set;
   store a set of scan statistics for the first scan that includes one or more RTT statistics for individual ones of the target ports;
   monitor the network to collect network latency measurements of the network;
   determine, based on the network latency measurements, to dynamically adjust the RTT-timeout parameter in the configuration parameters;
   determine, based on the scan statistics, a second RTT-timeout value for the RTT-timeout parameter different from the first RTT-timeout value; and
   perform a second scan of the target ports according to the second RTT-timeout value.

2. The system of claim 1, wherein
   the network latency measurements are collected by a network latency component of the network scanner, and the network latency component is configured to determine a current scanning condition of the network.

3. The system of claim 1, wherein
   the RTT-timeout parameter controls an amount of time that the network scanner waits for a response from a target port to determine whether the target port is responsive.

4. The system of claim 1, wherein
   the scan statistics for the first scan includes RTT values for a subset of the target ports that were successfully probed,
   the one or more RTT statistics include a maximum and a minimum of the RTT values, and
   the second RTT-timeout value is determined based on the maximum and the minimum of the RTT values.

5. The system of claim 4, wherein
   the second RTT-timeout value is selected from a range defined by the maximum and the minimum of the RTT values.

6. The system of claim 4, wherein
   the second RTT-timeout value is determined based on an average of the RTT values.

7. The system of claim 1, wherein the network scanner is configured to:
   store historical RTT values for individual one of the target ports over multiple previous scans;
   determine average RTT values for respective one of the target ports based on the historical RTT values; and
   determine the second RTT-timeout value based on the averages RTT values.

8. The system of claim 7, wherein
   the network scanner is configured to determine the second RTT-timeout value based on a variance of the RTT values.

9. The system of claim 1, wherein the network scanner is configured to:
   probe the target ports for responses; and
   assess the responses to determine different types of security vulnerabilities or violations.

10. The system of claim 1, wherein
   the target ports are exposed by computers in a private network, and
   the network scanner is external to the private network and configured to perform scans of the target ports over a public network.

11. A method comprising:
   executing a network scanner implementing using one or more computing devices, comprising:
   performing, according to a set of configuration parameters, a first scan of target ports in a network, wherein the configuration parameters includes a round trip time (RTT)-timeout parameter to which a first RTT-timeout value is initially set;
   storing a set of scan statistics for the first scan that includes one or more RTT statistics for individual ones of the target ports;
   monitoring the network to collect network latency measurements of the network;
   determining, based on the network latency measurements, to dynamically adjust the RTT-timeout parameter in the configuration parameters;
   determining, based on the scan statistics, a second RTT-timeout value for the RTT-timeout parameter different from the first RTT-timeout value; and
   performing a second scan of the target ports according to the second RTT-timeout value.

12. The method of claim 11, wherein
the network latency measurements are collected by a
network latency component of the network scanner,
and the network latency component is configured to
determine a current scanning condition of the network.

13. The method of claim 11, wherein
the RTT-timeout parameter controls an amount of time
that the network scanner waits for a response from a
target port to determine whether the target port is
responsive.

14. The method of claim 11, wherein
the scan statistics for the first scan includes RTT values
for a subset of the target ports that were successfully
probed; and
the one or more RTT statistics include a maximum and a
minimum of the RTT values, and
the second RTT-timeout value is determined based on the
maximum and the minimum of the RTT values.

15. The method of claim 14, wherein
the second RTT-timeout value is selected from a range
defined by the maximum and the minimum of the RTT
values.

16. The method of claim 14, wherein
the second RTT-timeout value is determined based on an
average of the RTT values.

17. The method of claim 11, further comprising the
network scanner:
storing historical RTT values for individual one of the
target ports over multiple previous scans;
determining average RTT values for respective one of the
target ports based on the historical RTT values; and
determining the second RTT-timeout value based on the
averages RTT values.

18. The method of claim 17, further comprising the
network scanner determining the second RTT-timeout value
based on a variance of the RTT values.

19. The method of claim 11, further comprising the
network scanner:
probing the target ports for responses; and
assessing the responses to determine different types of
security vulnerabilities or violations.

20. The method of claim 11, wherein
the target ports are exposed by computers in a private
network; and
the network scanner is external to the private network and
configured to perform scans of the target ports over a
public network.

*     *     *     *     *